Feb. 22, 1966                T. H. RUSSELL III                3,236,542
                            BOOKKEEPING APPARATUS
Filed Feb. 20, 1964                                    5 Sheets-Sheet 1

INVENTOR.
Thomas H. Russell, III
BY
Mc Cormick, Paulding & Huber
ATTORNEYS

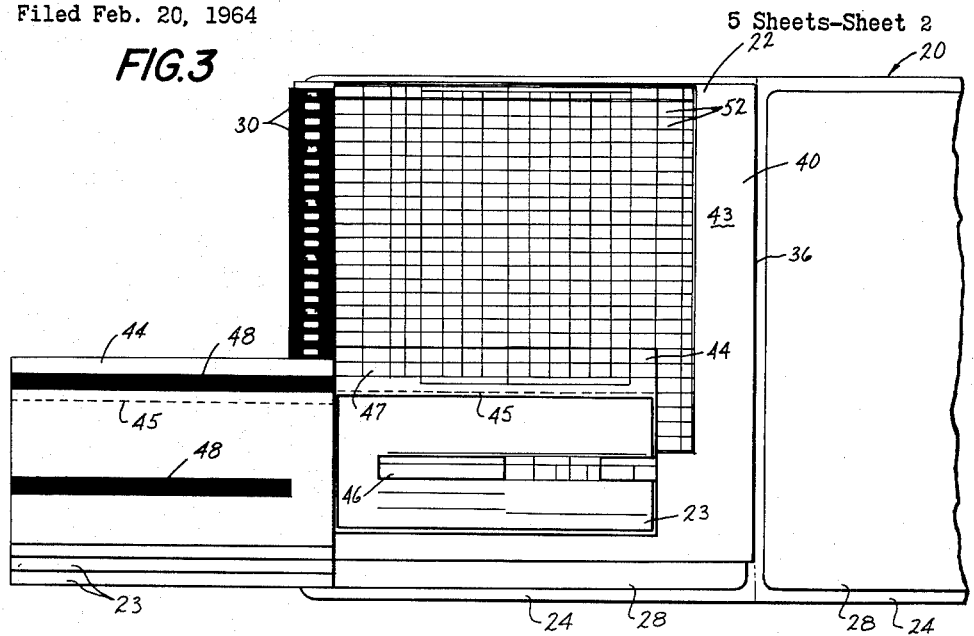
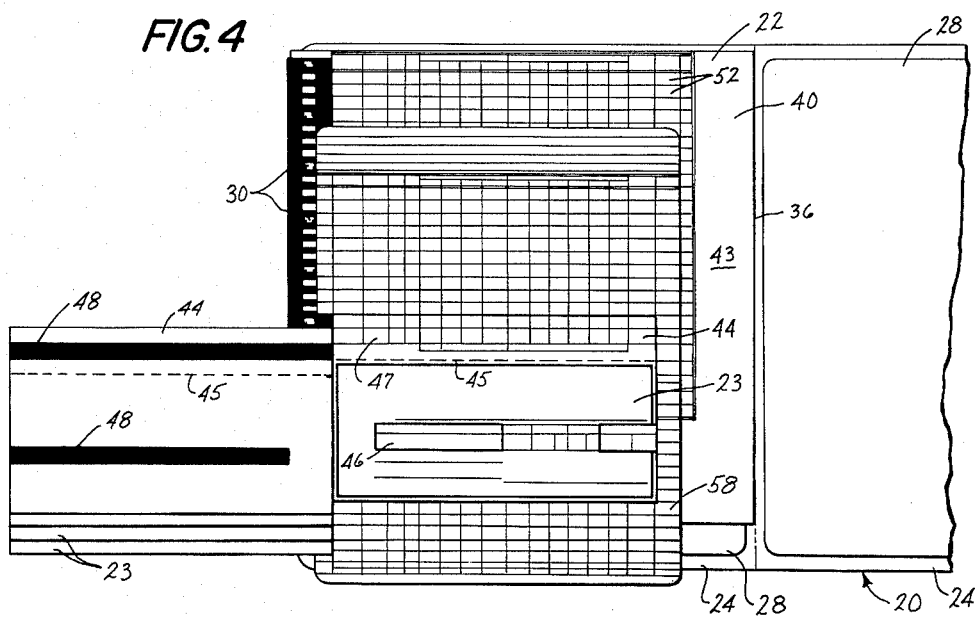
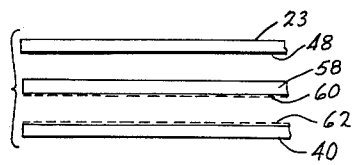

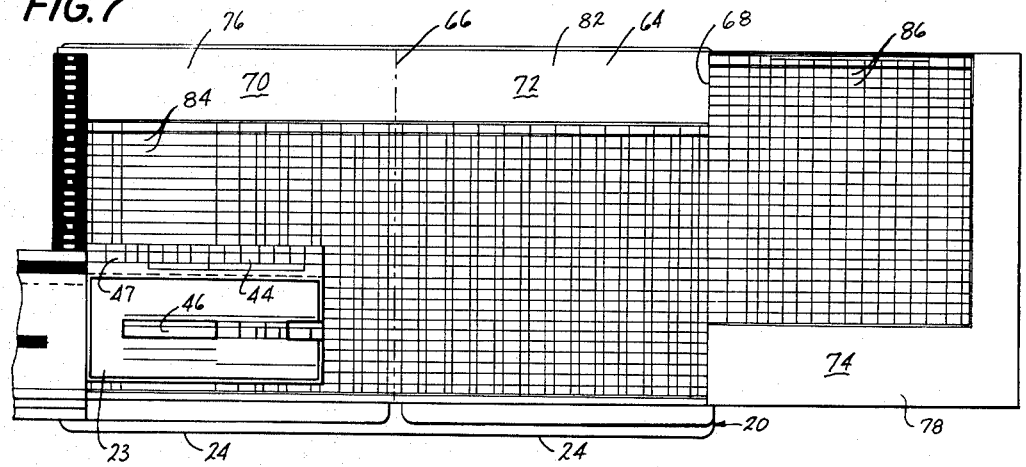
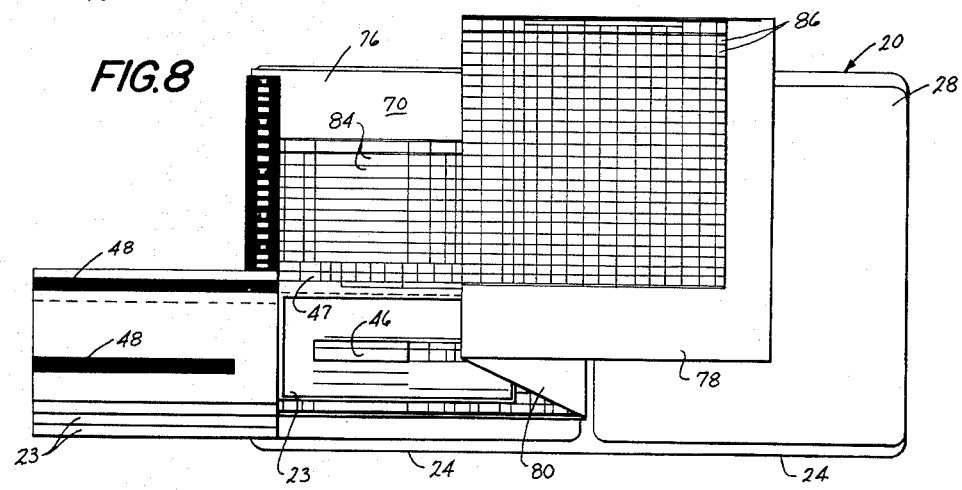
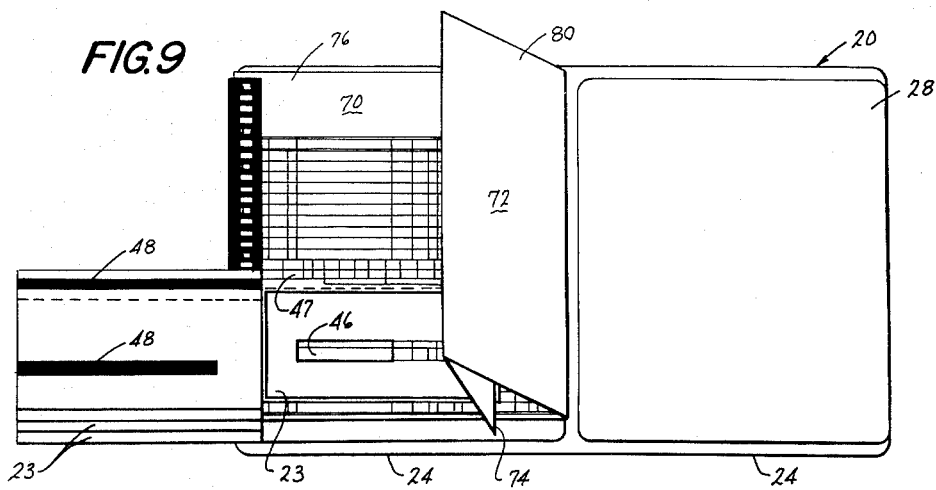

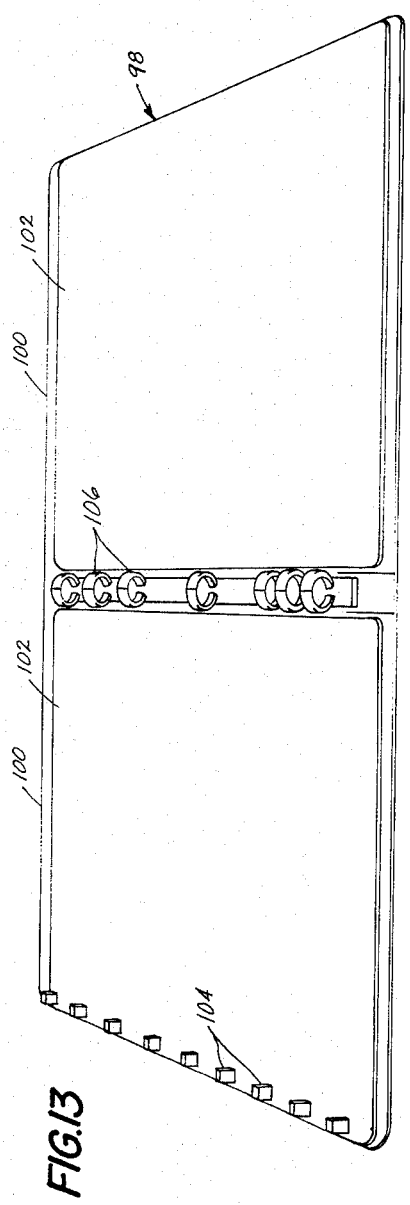
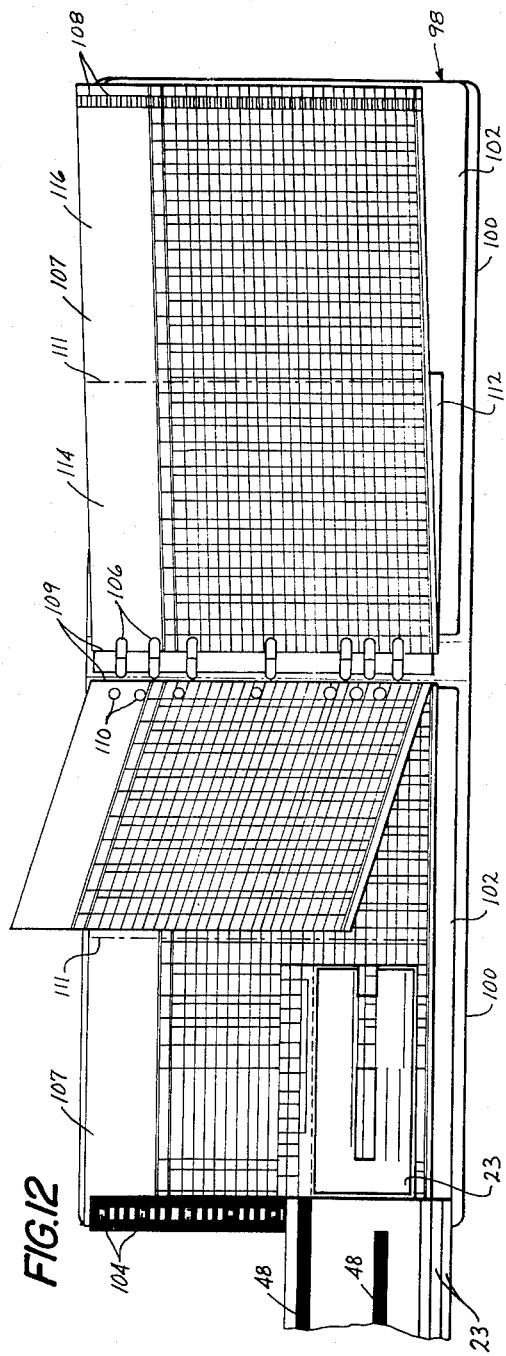
FIG.13
FIG.12

United States Patent Office 3,236,542
Patented Feb. 22, 1966

3,236,542
BOOKKEEPING APPARATUS
Thomas H. Russell III, 14 Sulgrave Road,
West Hartford, Conn.
Filed Feb. 20, 1964, Ser. No. 346,344
4 Claims. (Cl. 282—29)

This invention relates to apparatus for bookkeeping or accounting, and deals more particularly with a system of checks or invoices, journal sheets, ledger sheets, or the like wherein the drafting of the check, invoice or similar form causes the information entered in the form to be simultaneously recorded on one or more record sheets such as journal or ledger sheets.

The bookkeeping apparatus described herein and comprising the present invention may be used with various different forms and record sheets used in various different record keeping situations. For clarity the apparatus is herein described as applied to a cash disbursements situation wherein the forms involved are checks and the record sheets are or may be journal sheets, ledger sheets, or perhaps record sheets of some special character. Nevertheless, it is to be understood that there is no intention to limit the invention to this particular use.

The general object of this invention is to provide a bookkeeping apparatus which simplifies and reduces the amount of work involved in maintaining conventional business records.

Another object of this invention is to provide a bookkeeping apparatus of the foregoing character which may be made in a relatively compact size so as to be readily portable and convenient to handle in use, the apparatus if desired having the appearance and size of a conventional binder for record sheets.

A more particular object of this invention is to provide a bookkeeping apparatus including a number of forms, such as checks, associated with one or more record sheets for recording information concerning the transaction evidenced by the form, and wherein information entered on the form may be directly and simultaneously duplicated on a record sheet so as to eliminate the need for a separate posting of the information to the record sheet, the apparatus further being such that information entered at various different places on the form may be duplicated on various different panels of the record sheet.

A still more particular object of the invention is to provide a bookkeeping apparatus including an arrangement of forms and record sheets fixed relative to the forms for direct posting from the forms to the record sheets and also including one or more separate loose record sheets, such as ledger sheets, which may be inserted between the forms and the record sheets to obtain multiple posting from the forms simultaneously to both the fixed and loose record sheets.

Another object of the invention is to provide a bookkeeping apparatus wherein forms and record sheets are so arranged as to make efficient use of the space available on the record sheets, and particularly to provide sufficient space to permit the recorded items to be distributed over a large number of categories or columns.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 3 is similar to FIG. 2 except for showing the journal sheet folded to bring a different panel surface into immediately underlying relationship with the check.

FIG. 4 is similar to FIG. 3 but shows the apparatus in use with a ledger sheet inserted between the check and the journal sheet.

FIG. 5 is an enlarged and somewhat exaggerated fragmentary view taken in a vertical plane through FIG. 4 and shows one form of transfer means which may be used with the illustrated apparatus.

FIG. 7 is a plan view of a bookkeeping apparatus comprising another embodiment of the present invention.

FIG. 8 is a view showing the manner in which the journal sheet of FIG. 7 may be folded to bring a different panel surface into immediately underlying relationship with the check.

FIG. 9 is a view showing the way in which the journal sheet of FIG. 7 may be folded to bring still another panel surface into immediately underlying relationship with the check.

FIG. 12 is a view of a bookkeeping apparatus comprising still another embodiment of the present invention.

FIG. 13 is a perspective view of the binder used in the FIG. 12 apparatus.

Figure 1:
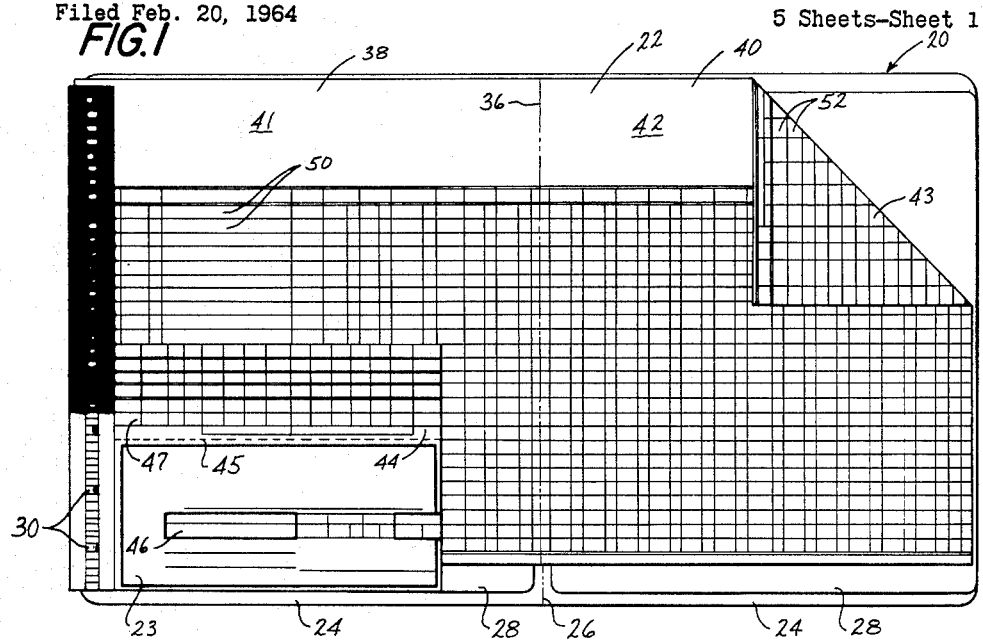
FIG. 1 is a plan view of a bookkeeping apparatus or system embodying the present invention, this view showing a number of unused checks overlying a journal sheet.

Turning now to the drawings and first considering FIGS. 1 to 6, these figures show one embodiment of the present invention. The embodiment illustrated by these figures includes a binder 20, a record sheet 22 (which is shown to be a journal sheet) and a stack of checks 23, 23. The binder 20 includes two leaves 24, 24 which for convenience may be foldable relative to one another about a vertical fold line 26 and each of which is preferably faced with a metal plate 28 that provides a relatively hard support and writing surface for the associated portion of the record sheet. Included in the binder is a holding means for holding the record sheet 22 and the checks 23, 23 in a fixed cooperative relationship with one another and with the binder. This holding means may take various different forms without departing from the invention, but in the illustrated case it consists of a vertical row of spaced posts 30, 30 located along the left-hand vertical edge of the left-hand leaf 24. As shown best in FIG. 6, the record sheet 22 includes openings 32, 32 in its left-hand vertical edge portion which are adapted to receive the posts 30, 30, and likewise the stack of checks 23, 23 also includes openings 34, 34 in its edge portion for similarly receiving the posts 30, 30.

The record sheet 22 is foldable about a vertical fold line 36 which is or may be prescored in the material of the sheet, the fold line dividing the record sheet into two adjacent panels 38 and 40, each providing two panel surfaces located respectively on opposite sides thereof. For example, in FIG. 1 one such panel surface is shown at 41, a second such panel surface is shown at 42 and a third such panel surface is shown at 43, the surfaces 42 and 43 being on opposite sides of the panel 40.

Figure 6:
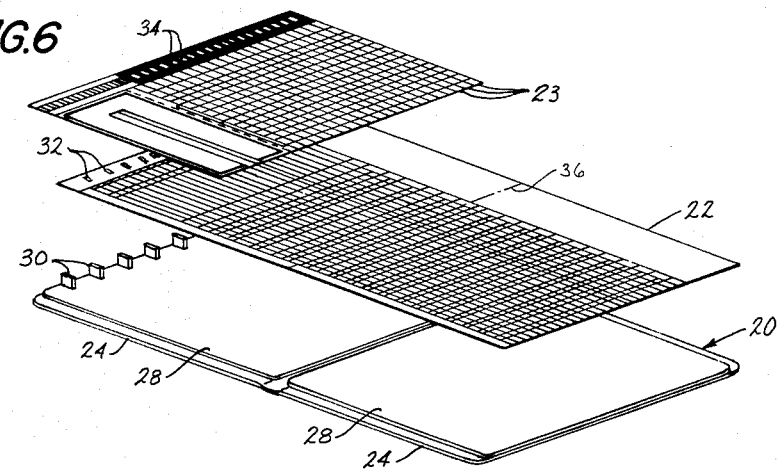
FIG. 6 is a reduced scale exploded perspective view of the bookkeeping apparatus of FIG. 1 and shows how the journal and checks are related to the binder.

The checks 23, 23 are arranged in a fanned relationship with their end edges aligned and with the upper side edge of each check protruding upwardly a predetermined distance beyond the upper side edge of the adjacent overlying form. In FIG. 6, a complete stack of checks 23, 23 is shown while in FIGS. 1, 2, 3 and 4 the stack is shown after a number of checks have been used and removed therefrom leaving a total of five unused checks in the stack. From FIGS. 2, 3 and 4 it will be noted that the arrangement of the checks is such that all except the lowermost check may be folded to the left to completely expose the lowermost check to permit its drafting and the entry of other information thereon.

The checks are of conventional rectangular shape and the main bodies thereof are preferably perforated along their left-hand end edges to permit the same, after the check is drafted, to be easily torn from the edge portion which is received on the posts 30, 30 of the binder. Each check 23 also includes a stub 44 located above the main body of the check and attached thereto by a horizontal perforated line 45. Included on each check is one horizontal line or area 46 for receiving various entries concerning the transaction evidenced by the check. For example, the check may be a dual purpose check designed for both payroll and non-payroll disbursements in which case the line 46 might include spaces for recording the name of the payee, the date, and the net amount of the check. Also included on the check 23 is a second horizontal line or area 47 for recording the same and/or additional information regarding the transaction, this line 47 being located on the stub 44 and spaced vertically by a given distance from the line 46.

Figure 2:
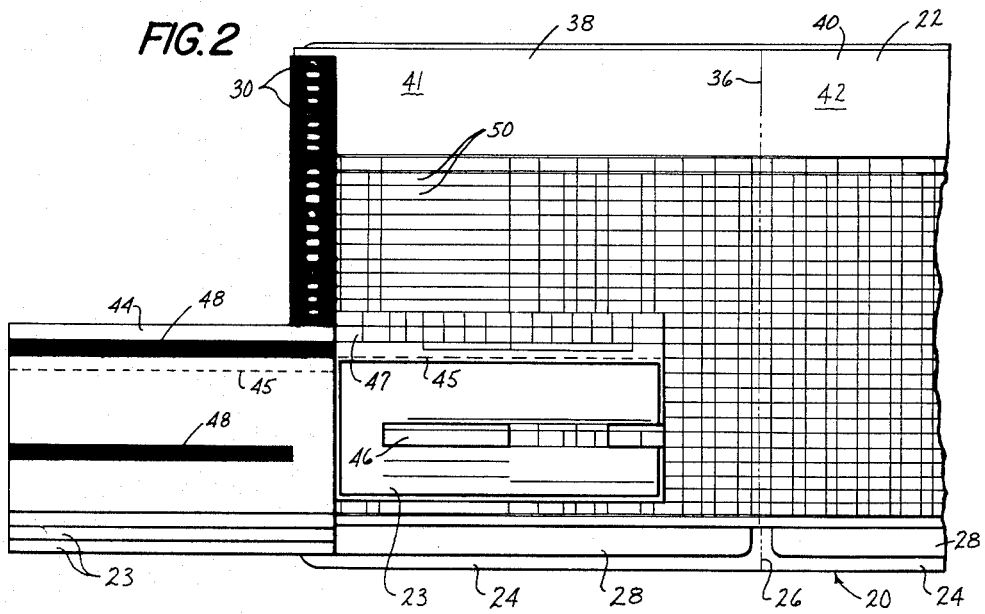
FIG. 2 is a fragmentary view of the apparatus of FIG. 1 and is similar to FIG. 1 except for showing all but the lowermost check folded away from the journal sheet to permit the drafting of the lowermost check and the entry of other information thereon.

In accordance with the present invention, the information entered on the lines 46 and 47 of each check is simultaneously duplicated on the record sheet 40 at desired locations so as to eliminate the later need for posting the information as a separate operation, and it is a feature of the apparatus of FIGS. 1 to 6 that the record sheet 40 may be folded along the fold line 36 to selectively bring either the panel surface 41 or the panel surface 43 into immediately underlying or posting relationship with the check being drafted to enable duplication of the entries either on the surface 41 or on the surface 43. In FIG. 2 the record sheet 40 is shown in a spread condition so that the active check 23 is immediately superimposed on the panel surface 41. In FIG. 3, the record sheet 40 is shown in a folded condition wherein the active check 23 is superimposed on the panel surface 43. Various different means may be employed for causing duplication of the entries written on the checks on the immediately underlying panel surfaces, and in the present instance this means is shown to consist of spot carbon coatings such as indicated at 48, 48 located on the undersurface of each check and registering with the lines 46 and 47 thereof.

Generally it will be desired to post the information entered on the line 46 on one record surface, for instance the surface 41, and to post the information entered on the line 47 on another record surface, for instance the surface 43. In the illustrated case, the journal surface 41 includes a set of lines 50, 50 which are equally vertically spaced by a distance equal to the spacing between adjacent checks 23, 23. The relationship between the checks and the lines 50, 50 is further such that the lines 50, 50 register with the lower lines 46, 46 of the stack of checks 23, 23 and such that the line 46 of the first check is vertically aligned with the uppermost line 50. That is, when a new record sheet 40 and a new stack of checks are properly arranged on the posts 30, 30 of the binder the lower entry line 46 of the first check registers with the first line 50 of the panel surface 41, the line 46 of the second check registers with the second line 50, and so forth. As shown in FIG. 3, the panel surface 43 also includes a set of horizontal lines 52, 52 which are equally spaced by a distance equal to the spacing of the checks 23, 23 in their stack. From FIG. 1, however, it will be noted that the set of lines 52, 52 is vertically offset, or shifted upwardly, relative to the set of lines 50, 50. The amount of offset is equal to the distance between the upper line 47 and the lower line 46 of each check. As a result, when the record sheet 40 is folded as shown in FIG. 3 the lines 52, 52 are aligned with the lines 47, 47 of the checks and the arrangement is further such that with a complete or new stack of checks the line 47 of the first check registers with the first line 52, the line 47 of the second check registers with the second line 52, and so forth.

From the foregoing it will be obvious that in using the system and as each check is drafted, the record sheet 40 may be first folded as shown in FIG. 3 and then entries made in the upper line 47 of the active check. These same entries are simultaneously duplicated on an associated line 52 of the journal record surface 43 by the action of the associated spot carbon coating 48. Next, the record sheet 40 may be unfolded as shown in FIG. 2 and entries thereafter made in the line 46. These latter entries are simultaneously duplicated on an associated line 50 of the journal record surface 41. The alignment of the checks and record sheet is accurate both horizontally and vertically and the postings on the record surfaces 41 and 43 are automatically related to each other by the fact that related postings appear on like numbered horizontal lines.

As is indicated in FIG. 4, the above-described bookkeeping apparatus may also be used in combination with a set of second record sheets such as the ledger sheet shown at 58. The sheet 58 is inserted between the active check 23 and the immediately underlying panel surface which may be either the surface 43 or the surface 41 depending upon whether the record sheet 40 is folded or unfolded. Where it is desired to use second record sheets such as the ledger sheet 58, additional transfer means are employed to cause the entries written on the lines 46, 47 of the check to not only transfer to the sheet 58, but also to the record sheet 40. Various different transfer means may be used to accomplish this, but preferably and as illustrated in FIG. 5, the undersurface of the record sheet 58 is provided with a coating 60 of "carbonless" sending material and the immediately underlying and upwardly facing surface of the record sheet 40 is provided with a coating 62 of "carbonless" receiving material, the coatings 60 and 62 being well known in the art and comprising a transfer means for causing the duplication of entries from the check through the sheet 58 to the record sheet 40 without the use of carbon paper or spot carbon coatings. Since the upwardly facing surface of the record sheet 40 may be either the panel surface 41 or the panel surface 43, and since the panel surfaces 41 and 43 are located on opposite sides of the record sheet, the "carbonless" receiving coating 62 is preferably, and more easily, applied over the entire extent of both sides of the record sheet 40 rather than over only the panel surfaces 41 and 43. Also, if desired, both sides of the record sheet 58 may be provided with entry lines and with a coating of "carbonless" sending material to permit entries to be made on either side thereof.

As will be evident from FIG. 5, when an entry is made on the check 23 on an area overlying the spot carbon coating 48, the entry will be transferred by the spot carbon coating 48 to the record sheet 58 and simultaneously the "carbonless" coatings 60 and 62 will function to also transfer the entries to the record sheet 40. As an alternative to the sending and receiving coatings 60 and 62, a single sheet of carbon paper could be inserted onto the posts 30, 30 above the record sheet. With the record sheet folded as shown in FIG. 3, the panel surface 43 could be brought under the carbon paper so that when a second record sheet, such as the sheet 58, is placed under the check being drafted the spot carbon on the check will cause the transfer of the entry to the record sheet 58 and the sheet of carbon paper will cause the transfer of the entry onto the surface 43. With the record sheet 40 unfolded, entries would be posted to the second record sheet 58 and to the surface 41. As a second alternative, in lieu of a receiving surface on the record sheet 40, this record sheet could be provided with a sending coating and the second record 58 could be provided with a receiving coating. In the use of this system the second record sheet 58 would be inserted under rather than above the record sheet 40.

It should also be noted here that although in the illustrated case the stub of the check has been shown located above the main body of the check, it could equally as well be located at the bottom of the check or at some other position. In comparison to checks wherein the stubs are located at one end of the main body of the check, the location of the stub at either the bottom or top of the check body increases the length of the check which is in contact with the posts 30, 30 and decreases the length the check extends away from the posts. Both of these factors tend to substantially improve the registration of the checks with the record sheet 40. Also, because of the relatively short length of the illustrated checks, the record sheet 40 and binder 20 may be folded to a compact size that will fit standard office drawers for storage as well as fitting into brief cases and other conventional receptacles. It should furthermore be noted that when a second record sheet 58 is used the binder posts 30, 30 serve to horizontally align the sheet 58 with the record sheet 40, the sheet 58 being moved to the left until it contacts the posts. As a result no separate holding means or aligning rail need be provided to the right of the posts 30, 30 for aligning the sheet 58. Accordingly the record sheet 40 may, if desired, be extended to the right to provide additional distribution columns or other entry spaces which are readily available to the user at the time the checks are drafted.

FIGS. 1 to 6 disclose an apparatus or system wherein the record sheet 40 is foldable along one fold line 36 to provide two multiple posting surfaces. The present invention, however, is not limited to only two multiple posting surfaces on the record sheet, and attention is directed to the other remaining figures for other embodiments of the system which provide additional multiple posting surfaces. Considering first FIGS. 7, 8 and 9, these figures disclose an apparatus which is or may be identical with that of FIG. 1 except for including a record sheet 64 which includes two fold lines 66 and 68, preferably prescored in the material of the record sheet, which divide the record sheet into three adjacent panels 70, 72 and 74. Parts of this apparatus which are similar to the apparatus of FIGS. 1 to 6 have been given the same reference numbers as in FIGS. 1 to 6 and need not be redescribed. As will be evident from FIGS. 7, 8 and 9, the record sheet may be completely unfolded as shown in FIG. 7 to bring the surface 76 of the panel 70 into posting relationship with the checks 23, 23. Alternatively, the record sheet may be folded in the manner shown in FIG. 8 to bring the panel surface 78 of the panel 74 into posting relationship with the checks, or the sheet may be folded as shown generally in FIG. 9 to bring the panel surface 80 of the panel 72 into posting relationship with the checks. It will, of course, be understood that in FIGS. 8 and 9 the record sheet 64 is shown for clarity in only partially folded conditions and that the folding process must be completed to bring the desired surfaces into posting position.

Still referring to FIGS. 7, 8 and 9, it should be noted that in the illustrated record sheet 64, the panel surfaces 76 and 82 are provided with mutually aligned sets of horizontal lines 84, 84. The lines, or at least parts thereof, on the panel surface 76 are intended to receive postings of entries made in the upper lines 47, 47 of the checks and the lines on the panel surface 82 provide additional columns for distribution. The panel surface 78 includes a set of lines 86, 86 which are vertically offset from the lines 84, 84 by a vertical spacing equal to the vertical spacing between the line 46 and the line 47 of each check. This offset adapts the set of lines 86, 86 for receiving entries from the check lines 47, 47. Accordingly, the lines 86, 86 are numerically related to the lines 84, 84 and to the individual checks as explained above in connection with the apparatus of FIGS. 1 to 6. Although panel surface 80 in FIGS. 8 and 9 is shown without lines, it will be understood that this surface may, if desired, be provided with lines either aligned with the lines 84, 84 or offset as are the lines 86, 86.

Figure 10:
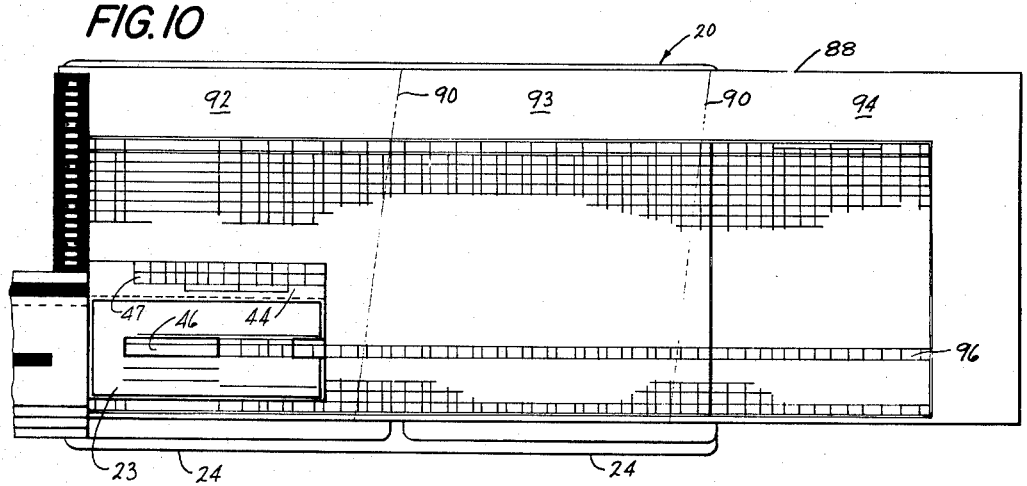
FIG. 10 is a plan view of a bookkeeping apparatus comprising still another embodiment of the present invention.
Figure 11:
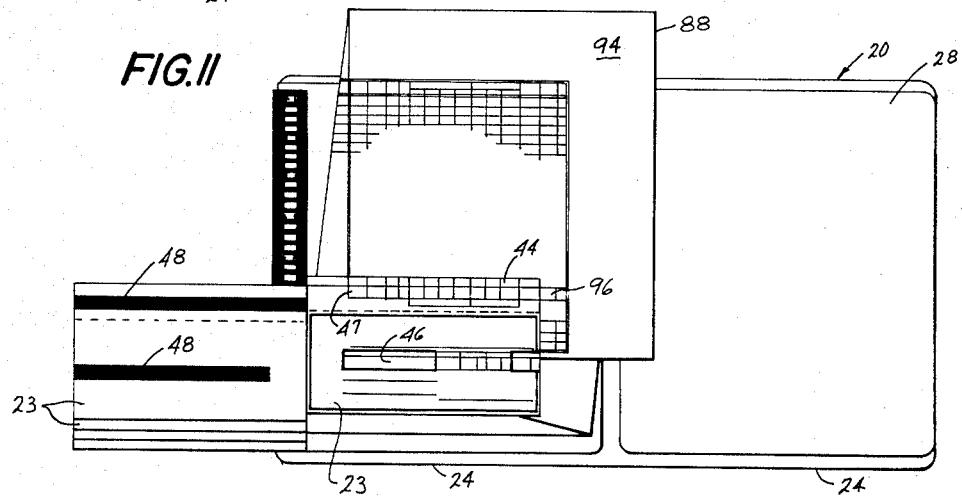
FIG. 11 is a view showing the manner in which the journal sheet of FIG. 10 may be folded to bring a different panel surface into immediately underlying relationship with the check.

FIGS. 10 and 11 relate to bookkeeping apparatus comprising another embodiment of the present invention which embodiment is generally similar to that shown in FIGS. 7, 8 and 9, except for including a novel arrangement of fold lines on the record sheet whereby entries posted from one check line to one panel surface will be horizontally aligned with entries posted from another check line to another posting surface desptie the fact that the two check lines are vertically spaced. Referring to FIGS. 10 and 11, the record sheet is shown at 88 and includes two parallel and vertically inclined, preferably prescored, fold lines 90, 90 which divide the sheet into three panels 92, 93 and 94 and which permit the record sheet to be folded from the spread condition of FIG. 10 to the folded condition of FIG. 11. In comparing FIG. 11 with FIG. 10, it will be noted that as a result of the folding the panel 94 is raised vertically from its unfolded or FIG. 10 position. Furthermore, the inclination of the fold lines 90, 90 is such that the panel 94 when moved from its unfolded to its folded position is raised an amount exactly equal to the spacing between the lines 46 and 47 of each check. This permits the upwardly facing panel surfaces of FIG. 10 to be provided with sets of horizontal lines which are vertically aligned so that each line is continued across all three panel surfaces in a straight horizontal manner. For example, in FIG. 10 it will be noted that for the illustrated active check 23 the record sheet 88 includes one horizontal line 96 which extends across the three panels 92, 93 and 94 and registers with the lower check line 46. When the record sheet is folded as shown in FIG. 11, the vertical offset of the panel 94 causes the same line 96 to now register with the upper check line 47. As a result, it will be obvious that if the record sheet is unfolded as shown in FIG. 10 when making entries in the line 46 and then folded as shown in FIG. 11 when making entries in the line 47, all of the entries posted from the lines 46 and 47 of any given check will appear on the same horizontal line 96 of the record sheet.

Still another embodiment of the invention is shown in FIGURES 12 and 13, the apparatus of this embodiment being particularly designed to provide for storage of additional record sheets and to provide additional space for distribution columns, the arrangement being such that two record sheets are placed side-by-side so that entries made on the front surface of one sheet may be carried across to distribution columns on the rear surface of the associated sheet. Referring to these figures, the apparatus includes a binder 98 including two leaves 100, 100 faced with metallic sheets 102, 102 for providing a support and writing surface for the record sheets. At the left-hand vertical edge of the left-hand panel is a row of holding elements in the form of posts 104, 104 generally similar to the posts 30, 30 of FIG. 6, and between the two leaves 100, 100 is another row of holding elements in the form of rings 106, 106. The rings are or may be of the type employed in conventional loose leaf ring binders and are collectively separable for the removal or addition of record sheets. The two leaves 100, 100 are preferably foldable about the rings 106, 106 to provide a compact arrangement for storage when the apparatus is not in use. The journal or record sheets are shown at 107, 107, one being attached to the rings 106, 106 and the other attached to the posts 104, 104. Each record sheet 107 includes two vertical fold lines 109, 111 which divide the sheet into three panels. For attachment to the posts 104, 104, each sheet along one vertical edge includes a plurality of openings 108, 108. For attachment to the rings 106, 106 each sheet additionally contains two vertical rows of openings 110, 110, each row being located on a respective side of the fold line 109 so that the record sheet may be attached to the rings with one panel 112 folded as shown in FIG. 12. Although in FIG. 12 only one record sheet is shown attached to the rings 106, 106, it will be understood that a number of additional sheets may be attached thereto for convenient storage.

In the use of the FIGS. 12 and 13 apparatus, one record sheet is removed from the rings 106, 106 and placed on the post 104, 104. Thereafter a stack of checks is placed over this record sheet as shown in FIG. 12. The record sheet attached to the posts may be used in substantially the same manner as the record sheet 64 of the FIGS. 7, 8 and 9 system. That is, it may be folded along its fold lines 109 and 111 to bring any one of three panel surfaces into immediately underlying or posting relationship with the active check 23. Similarly, when one record sheet is fastened to the posts and another record sheet is attached to the rings, as shown in FIG. 12, the panel surfaces 114 and 116 of the right-hand sheet may be used to provide additional distribution columns for entries made in the left-hand record sheet. The lines on the two record sheets, the posts 104, 104, the rings 106, 106, the openings 108, 108 and the openings 110, 110 being so related that the lines on the panel surfaces 114 and 116 of the right-hand record sheet are vertically aligned with the lines on the upwardly facing surfaces of the left-hand record sheet.

The invention claimed is:

1. Bookkeeping apparatus comprising a plurality of generally rectangular forms arranged in a fanned stack with their end edges aligned and with the upper side edge of each form positioned a predetermined distance upwardly beyond the upper side edge of the adjacent overlying form, a binder including two vertical rows of spaced holding elements, two generally rectangular record sheets each including two vertical fold lines dividing the same into first, second and third side-by-side panels which are foldable relative to one another, each record sheet having a set of openings along the free vertical edge of its first panel for receiving the holding elements of one of said vertical rows and also having two other similar sets of openings located with one on either side of the fold line separating said second and third panels for receiving the holding elements of the other of said vertical rows, said two rows of holding elements and said openings in said record sheets being so arranged that when one record sheet is attached to said one row of holding elements with the third panel thereof folded over said second panel and the other record sheet is attached to said second row of holding elements with said third panel folded under said second panel said other record sheet is located in close side-by-side and vertically aligned relation to said one record sheet so as to essentially form a continuation of the latter, said forms also including openings along one edge thereof for receiving said holding elements of said one row to hold said forms in overlying relationship with said one record sheet, said one record sheet being foldable along its fold lines to bring any one of three panel surfaces into immediately underlying relationship with said forms, and transfer means for causing written entries made on said vertically spaced lines of said forms to be duplicated on the immediately underlying panel surface.

2. Bookkeeping apparatus as defined in claim 1 further characterized by said one row of holding elements comprising a plurality of posts.

3. Bookkeeping apparatus as defined in claim 2 further characterized by said binder including two leaves foldable relative to each other about a vertical fold line located adjacent said other row of holding elements, said one row of holding elements being located adjacent the free vertical edge of one of said leaves.

4. Bookkeeping apparatus comprising a plurality of generally rectangular forms arranged in a fanned stack with their end edges aligned and with the upper side edge of each form positioned a predetermined distance upwardly beyond the upper side edge of the adjacent overlying form, a binder including first and second generally flat leaves and a row of ring-type holding elements about which said leaves are foldable between open and closed positions, said leaves when in said open position being located on opposite sides of said row of holding elements, two generally rectangular record sheets each including a vertical fold line dividing the same into first and second side-by-side panels which are foldable relative to each other, each of said record sheets having a first set of openings along the free vertical edge of its first panel and also having two other sets of openings located with one set on either side of the fold line separating said first and second panels for receiving said ring-type holding elements, said stack of forms also including a set of openings along one edge thereof, holding means receivable by said set of openings in said stack of forms and by said first set of openings in each record sheet for holding said stack of forms in fixed overlying relationship with one of said record sheets when said leaves are in their open position and while said one record sheet overlies said first binder leaf and said other record sheet overlies said second binder leaf, said one record sheet being foldable along its fold line to bring either one of its two panels into immediately underlying relationship with said forms, and transfer means for causing written entries made on said forms to be duplicated on the immediately underlying panel of said one record sheet.

References Cited by the Examiner

UNITED STATES PATENTS

| | | | |
|---|---|---|---|
| 2,435,684 | 2/1948 | Jones | 282—29.2 |
| 2,470,586 | 5/1949 | Tathwell | 282—9 |
| 2,524,128 | 10/1950 | Jones | 282—29.2 |
| 2,757,940 | 8/1956 | Moss | 282—23 |
| 2,922,661 | 1/1960 | Ayers et al. | 282—22 |
| 2,976,062 | 3/1961 | Brechner | 282—29.2 |

FOREIGN PATENTS 607,428   8/1948   Great Britain.

LAWRENCE CHARLES, *Primary Examiner.*

EUGENE R. CAPOZIO, *Examiner.*